(12) United States Patent
Wootton et al.

(10) Patent No.: US 8,060,596 B1
(45) Date of Patent: Nov. 15, 2011

(54) METHODS AND SYSTEMS FOR NORMALIZING DATA LOSS PREVENTION CATEGORIZATION INFORMATION

(75) Inventors: Bruce Wootton, Alameda, CA (US); Richard Dandliker, Oakland, CA (US); Aleksey Tsibulya, San Rafael, CA (US); Oskar Bruening, Emeryville, CA (US); Dirk Kessler, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 122 days.

(21) Appl. No.: 12/415,329

(22) Filed: Mar. 31, 2009

Related U.S. Application Data

(63) Continuation-in-part of application No. 11/964,264, filed on Dec. 26, 2007.

(51) Int. Cl.
*G06F 15/173* (2006.01)
*G06F 15/16* (2006.01)
*G06F 17/00* (2006.01)
*H04L 9/32* (2006.01)

(52) U.S. Cl. ............ 709/223; 709/246; 713/176; 726/1
(58) Field of Classification Search .................. 709/223, 709/246; 713/176; 726/1
See application file for complete search history.

(56) References Cited

U.S. PATENT DOCUMENTS

| 2007/0157287 A1* | 7/2007 | Lim ................................. 726/1 |
| 2007/0226504 A1* | 9/2007 | de la Iglesia et al. .......... 713/176 |
| 2008/0040510 A1* | 2/2008 | Warner et al. ................. 709/246 |

* cited by examiner

*Primary Examiner* — Wing Chan
*Assistant Examiner* — David Yi
(74) *Attorney, Agent, or Firm* — Advantedge Law Group

(57) ABSTRACT

A computer-implemented method for normalizing data-loss-prevention categorization information, at least a portion of the method being performed by a computing system comprising at least one processor, may identify a data object at a first time. The method may apply a first version of a set of data-loss-prevention rules to the data object to determine a set of categorizations of the data object. The method may distinguish a set of content-based categorizations in the set of categorizations from a set of context-based categorizations in the set of categorizations. The method may apply, based on the set of categorizations, a first data-loss-prevention policy to the data object. The method may identify the data object at a second time, and apply, based on the set of content-based categorizations, a second data-loss-prevention policy to the data object. Various other methods, systems, and computer-readable media are also disclosed.

19 Claims, 7 Drawing Sheets

METHODS AND SYSTEMS FOR NORMALIZING DATA LOSS PREVENTION CATEGORIZATION INFORMATION

BACKGROUND

In the electronic information age, people may share, access, and disseminate information in seemingly unlimited volume. The ability to disseminate information in electronic format is enormously empowering. At the same time, the workforce has become increasingly mobile, and the ubiquity of high-speed Internet access, smart mobile devices, and portable storage means that "the office" may be anywhere. As a consequence, it has become more difficult than ever for organizations to prevent the loss of sensitive data. Organizations are therefore increasingly looking to Data Loss Prevention ("DLP") solutions to protect their sensitive data.

A typical DLP system may include a data-protocol parser, a textual-content extractor, a content-matching engine, and a rules-enforcement engine. Data analyzed by a DLP system may be processed by each of these engines to determine whether an enforcement action, such as blocking transmission of a file, quarantining a file, or creating a security violation, should occur. The two most computationally expensive stages in DLP may be content extraction and content matching. These DLP stages may tax numerous resources, causing application timeouts, higher load on network processors, and central-processing-unit spikes on local systems. Because of the cost of content extraction and matching, efficient and thorough DLP may not be possible using traditional DLP systems in some situations.

SUMMARY

Embodiments of the instant disclosure may improve DLP by shifting and/or reducing DLP resource consumption loads in space and/or time through categorization-information normalization. For example, after a DLP system has applied a set of DLP rules to a data object to determine a set of categorizations of the data object, the DLP system may distinguish a set of content-based categorizations in the set of categorizations from a set of context-based categorizations. At a later point in time, the DLP system may use the set of content-based categorizations, rather than recalculating the categorizations, to apply a DLP policy to the data object.

In some embodiments, the DLP system may, before the DLP policy is applied to the data object, determine whether the DLP rules, as they existed at the time they were created, are applicable to the data object. For example, an applicability module may determine a difference between the state of the set of DLP rules at the time they were created and a state of the DLP rules at the current time. If the difference is below a predetermined threshold, the DLP system may indicate to an enforcement module that the content-based categorizations determined earlier may be used to enforce a policy on the data object. On the other hand, if the difference is above a predetermined threshold, the DLP system may direct a content-extraction module and/or a content-matching module to update the set of categorizations.

In some embodiments, the difference may be a difference between a first time and a second time. In other embodiments, the difference may be a distance between the first and second states of the set of data-loss-prevention rules. According to various embodiments, the DLP system may include the set of content-based categorizations with the data object as metadata of the data object. Additionally or alternatively, the DLP system may cache the set of content-based categorizations.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
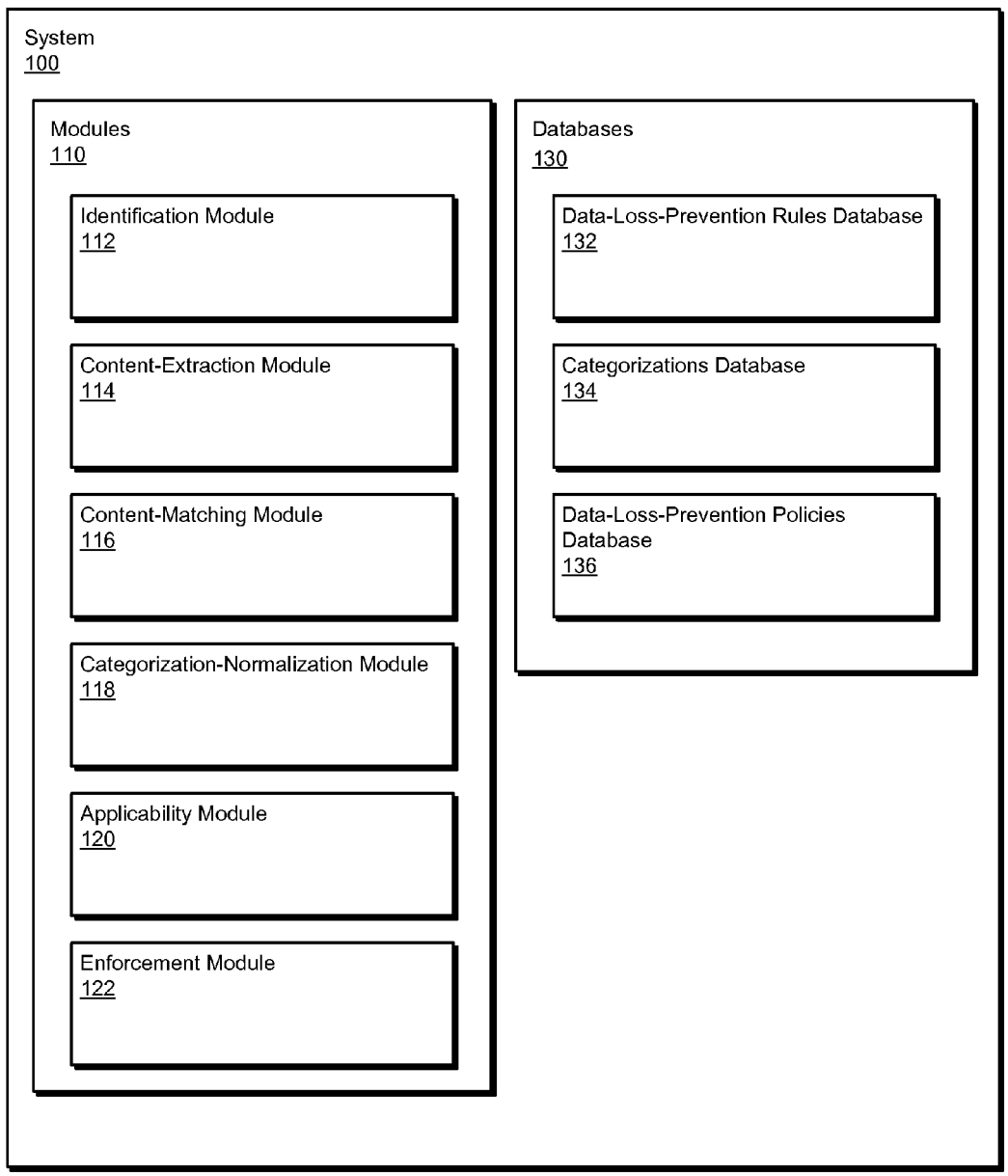
FIG. 1 is a block diagram of an exemplary system for normalizing DLP-categorization information according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure are directed to normalizing DLP-categorization information. For example, a categorization module may distinguish a set of content-based categorizations in a set of categorizations from a set of context-based categorizations in the set of categorizations. The content-based categorizations may be used at a later point in time to apply a DLP policy to the data object.

Embodiments of the instant disclosure may provide various features and advantages over traditional DLP systems. For example, embodiments of the instant disclosure may decrease memory, central-processing-unit, and network-bandwidth loads needed to effectively apply DLP policies. Embodiments disclosed herein may substantially eliminate the need to rescan a substantial percentage of files on a system and may allow organizations to expand the scope of their DLP policies. In general, the DLP technologies described herein may be able to scan a larger number of files over a shorter period of time compared to traditional DLP systems. Thus, DLP technologies disclosed herein may create a more relevant and comprehensive view of data-loss risk in an organization.

Figure 2:
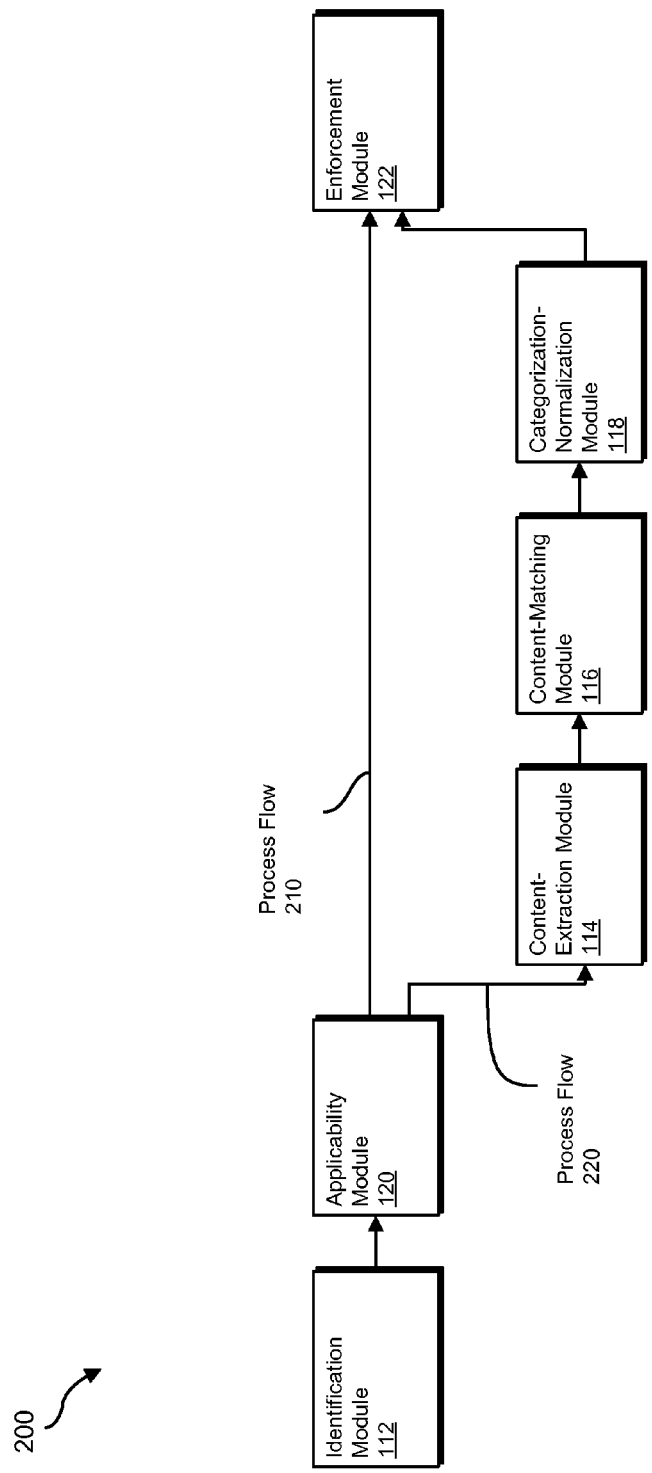
FIG. 2 is an exemplary process flow for normalizing and applying DLP-categorization information according to certain embodiments.
Figure 3:
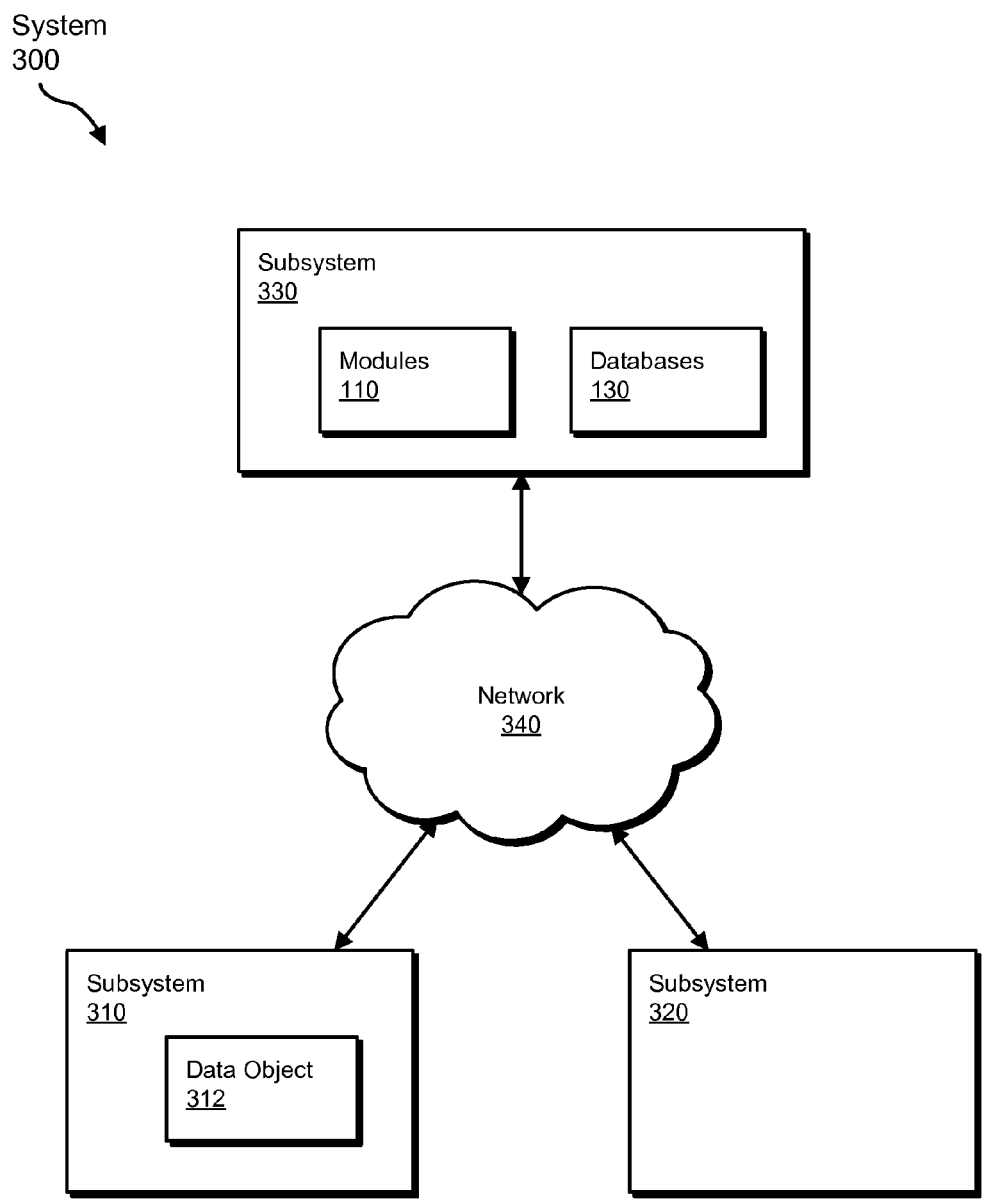
FIG. 3 is a block diagram of an exemplary system for normalizing DLP-categorization information according to certain embodiments.
Figure 4:
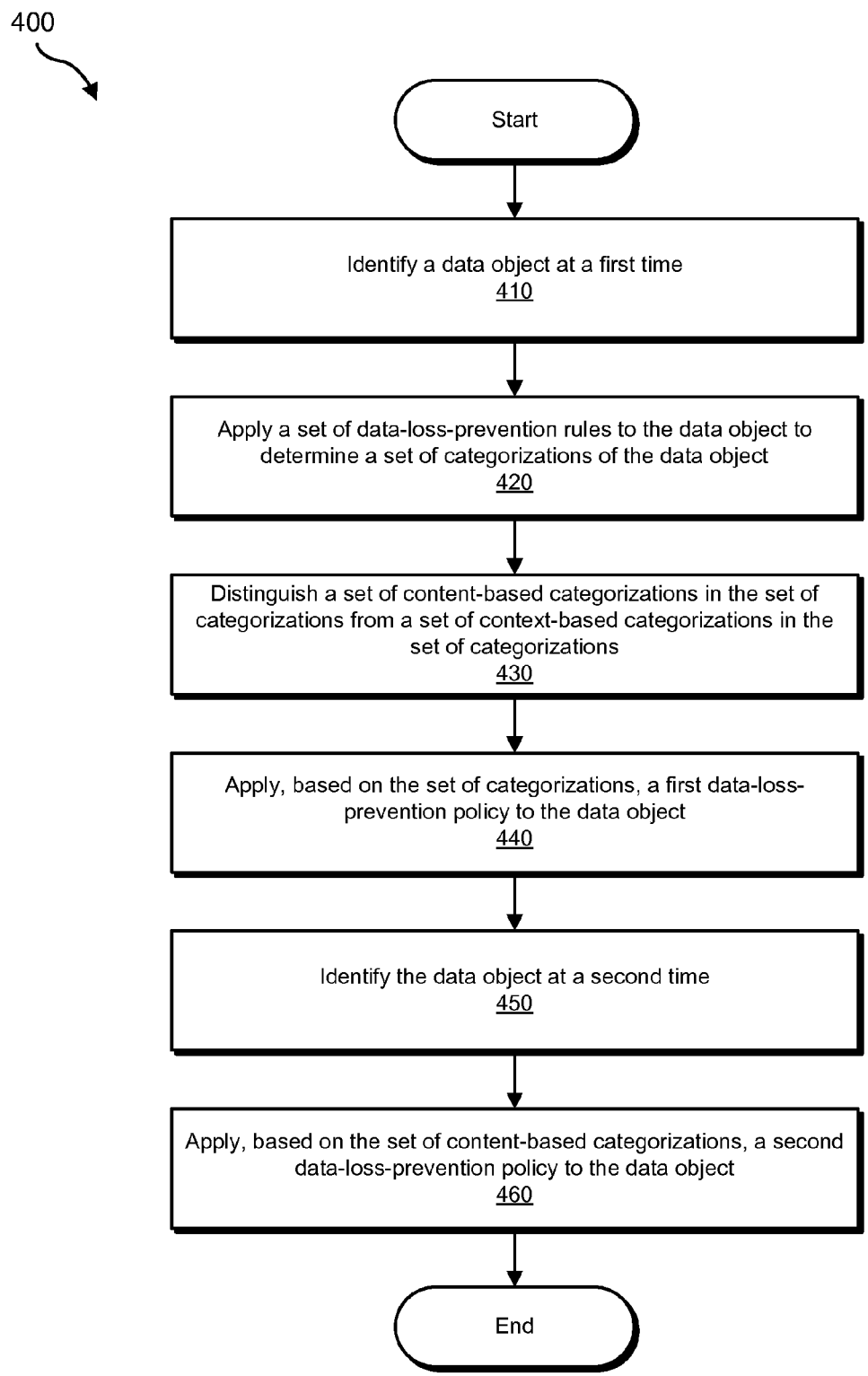
FIG. 4 is a flow diagram of an exemplary method for normalizing DLP-categorization information according to certain embodiments.
Figure 5:
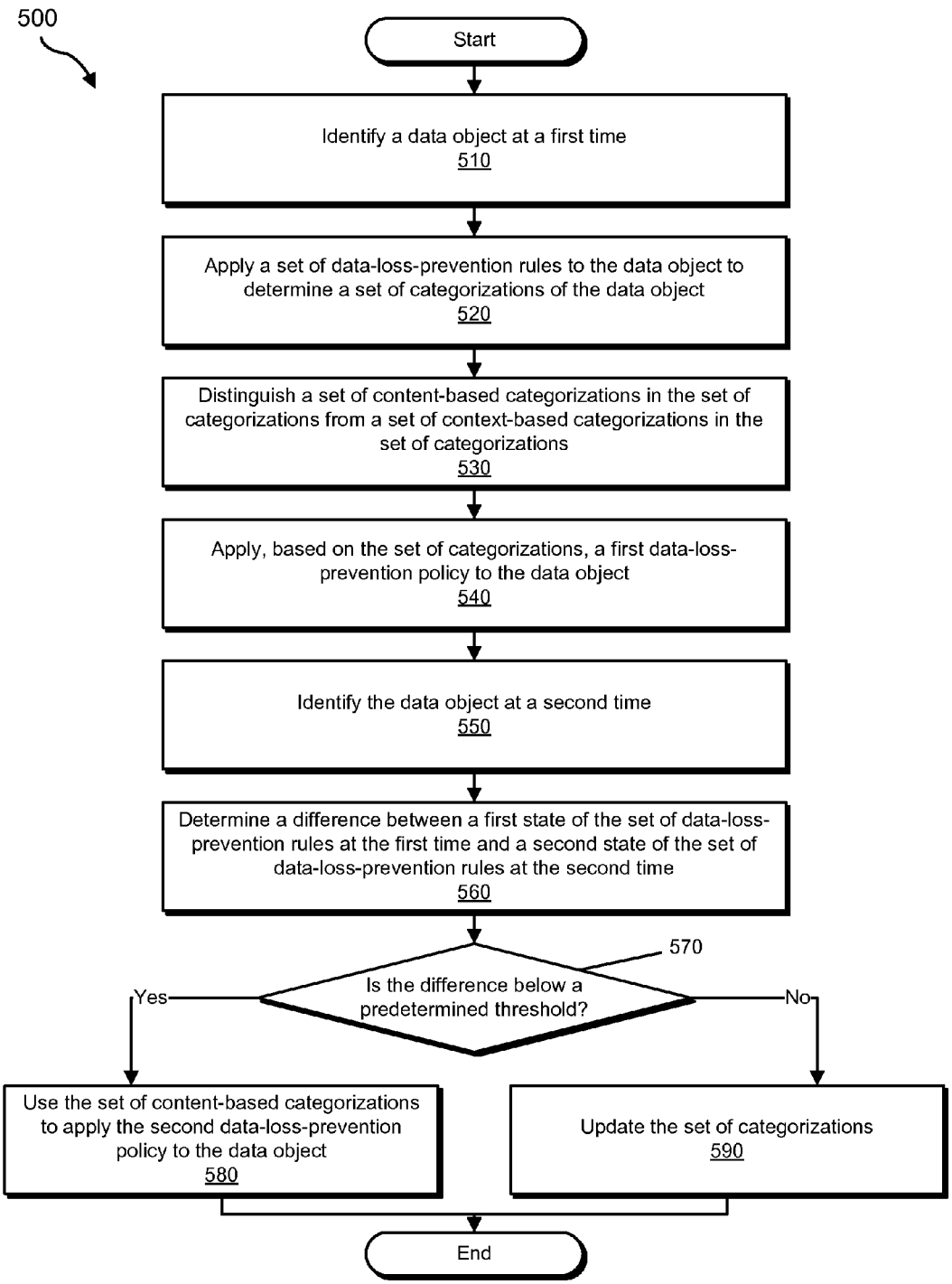
FIG. 5 is a flow diagram of another exemplary method for normalizing DLP-categorization information according to certain embodiments.
Figure 6:
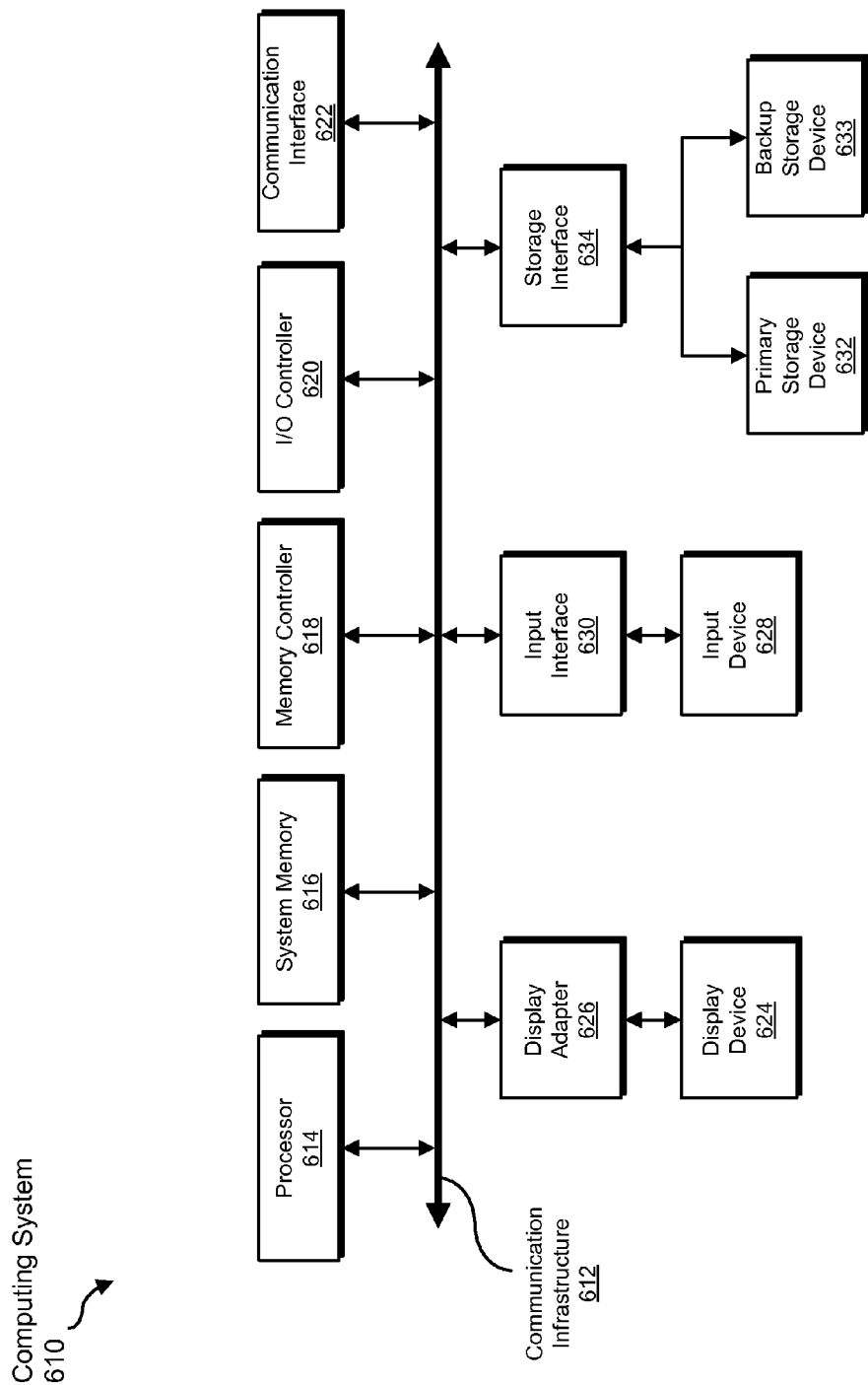
FIG. 6 is a block diagram of an exemplary computing system capable of implementing one or more of the embodiments described and/or illustrated herein.
Figure 7:
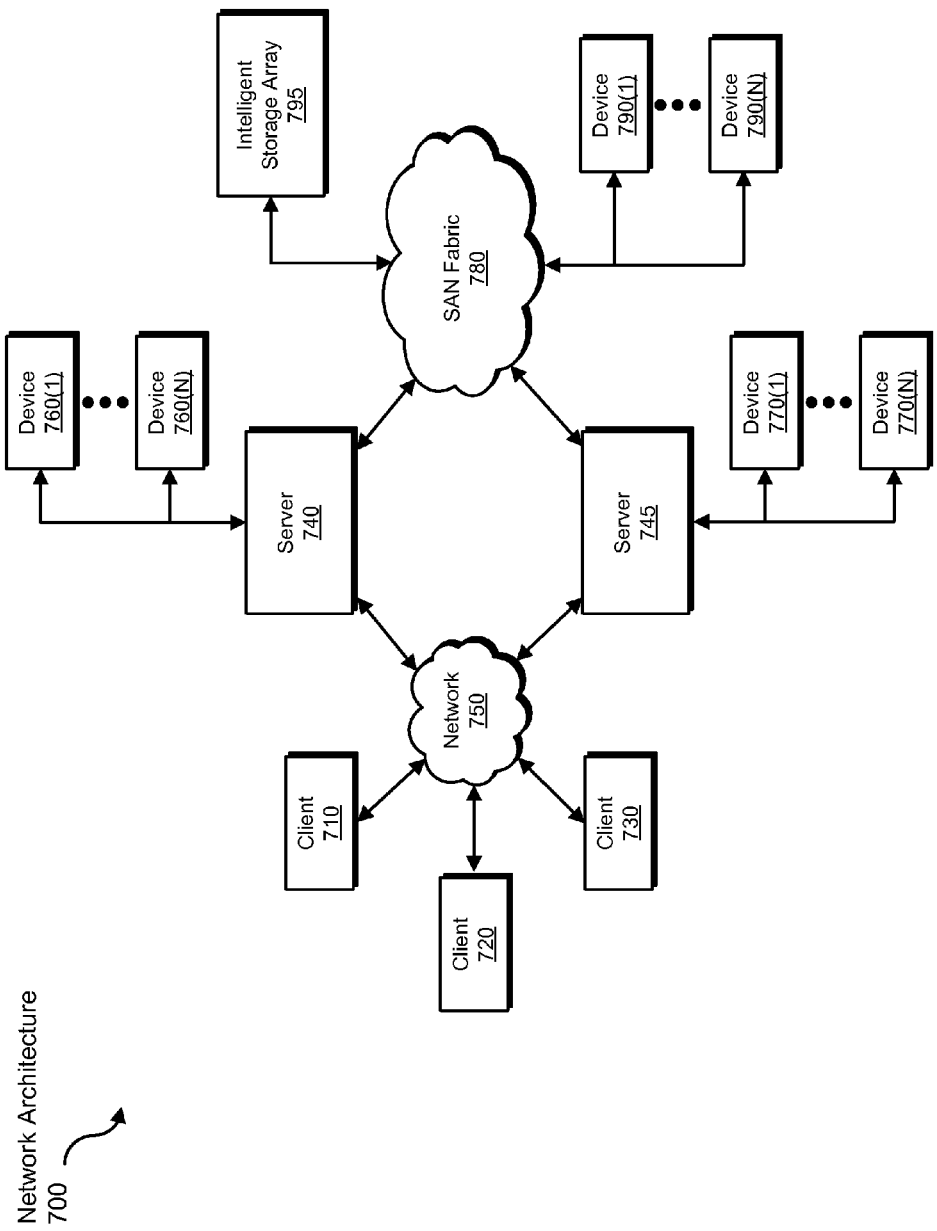
FIG. 7 is a block diagram of an exemplary computing network capable of implementing one or more of the embodiments described and/or illustrated herein.

FIGS. 1 and 3 show exemplary systems for normalizing DLP-categorization information, FIG. 2 shows an overview of a process flow for implementing DLP-categorization information normalization, and FIGS. 4 and 5 show methods for accomplishing the same. FIGS. 6 and 7 illustrate an exemplary computing system and network architecture for implementing embodiments of the instant disclosure.

FIG. 1 illustrates an exemplary DLP system 100. System 100 may include modules 110 and databases 130. Modules 110 may include an identification module 112, a content-extraction module 114, a content-matching module 116, a categorization-normalization module 118, an applicability module 120, and an enforcement module 122.

Identification module 112 may be programmed to identify a data object at a first time and at a second time. Content-extraction module 114 may be programmed to extract data from the data object, and content-matching module 116 may be programmed to apply a first version of a set of DLP rules to the data object to determine a set of categorizations of the data object. Categorization-normalization module 118 may be programmed to distinguish a set of content-based categorizations in the set of categorizations from a set of context-based categorizations in the set of categorizations, and enforcement module 122 may be programmed to apply DLP policies to the data object. Applicability module 120 may be programmed to determine a difference between a first state of the set of DLP rules at the first time and a second state of the set of DLP rules at the second time. Applicability module 120 may also be programmed to determine, based on the difference, whether to use the set of content-based categorizations to apply a second DLP policy to the data object.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 610 in FIG. 6 and/or portions of exemplary network architecture 700 in FIG. 7. One or more of modules 110 in FIG. 1 may also represent all or portions of one or more special-purpose computers configured to perform one or more of the tasks associated with the steps disclosed herein.

As previously noted, system 100 may include databases 130. Databases 130 may include a DLP-rules database 132, a categorizations database 134, and a DLP-policies database 136. DLP-rules database 132 may store one or more DLP rules, categorizations database 134 may store one or more content-based categorizations of a data object, and DLP-policy database 136 may store one or more DLP policies.

One or more databases 130 in FIG. 1 may represent a portion of one or more computing devices. For example, one or more databases 130 may represent a portion of one or more of the subsystems illustrated in FIG. 3, computing system 610 in FIG. 6, and/or portions of exemplary network architecture 700 in FIG. 7. Alternatively, one or more databases 130 in FIG. 1 may represent one or more physically separate devices capable of being accessed by a computing device, such as one or more of the subsystems illustrated in FIG. 3, computing system 610 in FIG. 6, and/or portions of exemplary network architecture 700 in FIG. 7.

FIG. 2 shows an exemplary process flow 200 for modules 110 of FIG. 1. Identification module 112 may identify a data object at a first time. In some embodiments, identification module 112 may also identify a protocol of the data object to enable a content-extraction module to extract data from the data object. Next, applicability module 120 may determine whether a previously calculated set of content-based categorizations may be applied to the data object. For example, applicability module 120 may identify content-based categorizations as metadata in the data object. In other embodiments, applicability module 120 may identify content-based categorizations associated with the data object in a database, such as categorizations database 134.

If applicability module 120 identifies previously calculated content-based categorizations for the data object and determines that the content-based categorizations are still applicable to the data object, applicability module 120 may proceed with process flow 210. In process flow 210, applicability module 120 may direct enforcement module 122 to use the previously determined content-based categorizations in enforcing one or more DLP policies on the data object.

If applicability module 120 cannot find content-based categorizations for the data object, or if the previously calculated content-based categorizations are no longer applicable (applicability is discussed in detail in the disclosure corresponding to FIGS. 4 and 5), applicability module 120 may cause process flow 200 to follow process flow 220. In process flow 220, content-extraction module 114 may extract content from the data object, and content-matching module 116 may attempt to match the content of the data object with one or more DLP rules, such as the DLP rules stored in DLP-rules database 132. Content-extraction module 114 and content-matching module 116 may extract and match content using any suitable DLP technology.

Content-matching module 116 may create a set of categorizations of the data object by applying a set of DLP rules to the data object. Categorization-normalization module 118 may distinguish content-based categorizations in the set of categorizations from context-based categorizations in the set of categorizations. The content-based categorizations may be added to the data object and/or stored or cached for later use. Enforcement module 122 may then enforce a DLP policy on the data object based on the set of categorizations. While FIG. 2 shows that the content-based categorizations are identified before a DLP policy is applied, in some embodiments, categorization-normalization module 118 may identify the content-based categorizations after enforcement module 122 enforces a policy or at any other point in time.

FIG. 3 shows an exemplary system 300 in which the process shown in FIG. 2 may be implemented. System 300 may include a subsystem 310, a subsystem 320, and a subsystem 330. Subsystems 310, 320, and/or 330 may generally represent any type or form of computing device capable of reading computer-executable instructions. Examples of computing subsystems 310, 320, and 330 may include, without limitation, laptops, desktops, servers, cellular phones, personal digital assistants ("PDAs"), multimedia players, embedded systems, combinations of one or more of the same, exemplary computing system 610 in FIG. 6, or any other suitable computing device.

Subsystem 310 may include a data object 312. Subsystem 330 may include one or more of modules 110 and/or one or more databases 130 and may represent a DLP system. Subsystems 310 and 320 may represent user computer systems. When a user tries to transmit data object 312 from subsystem 310 to subsystem 320, subsystem 330 may apply one or more DLP policies to data object 312. Various other data-handling actions on subsystems 310 and/or 320 may also trigger DLP analysis by subsystem 330, as discussed in more detail below. While FIG. 3 shows components of a DLP system as being remote from monitored devices, one or more of modules 110 and/or databases 130 may be located locally on a monitored device.

Subsystems 310, 320, and/or 330 may communicate over network 340. Network 340 generally represents any medium or architecture capable of facilitating communications or data transfer. Network 340 may include, without limitation, an intranet, a wide area network, a local area network, a personal area network, the Internet, power line communications, a cellular network, or the like. Network 340 may facilitate communications or data transfer using wireless and/or wired communications.

FIG. 4 shows an exemplary method for normalizing DLP-categorization information. The steps shown in FIG. 4 may be performed by any suitable computer-executable code and/or computing system. In some embodiments, the steps shown in FIG. 4 may be performed by one or more of modules 110. For example, at step 410 identification module 112 may identify a data object, such as data object 312, at a first point in time.

Identification module 112 may identify the data object in any suitable manner. In some embodiments, identification module 112 may implement any identification technique used by traditional DLP technologies to identify the data object. For example, identification module 112 may monitor network traffic, such as e-mails, instant messages, text messages, and/or any other traffic that may transfer data, to identify the data object. Identification module 112 may additionally or alternatively identify information copied to USB devices or other removable media devices, information copied to local drives, information being burned to CDs or DVDs, information being faxed, and/or information transferred over or to any other medium.

As used herein, the phrase "data object" may refer to any form or type of data entity or digital information. For example, data objects may include data files, executable files, file segments or other portions of files, database entries, one or more segments of executable code, financial information, customer information, pricing information, product design information, trade-secret information, confidential information, privileged information and/or any other file or information.

Returning to FIG. 4, at step 420 content-matching module 114 may apply a set of DLP rules to the data object to determine a set of categorizations of the data object. As used herein, the phrase "DLP rule" may refer to a rule that describes, defines, or otherwise identifies content that an organization desires to protect. A DLP rule may be configured in a variety of formats or configurations. For example, DLP rules may include signatures, such as hashes, of sensitive data. Additionally or alternatively, a DLP rule may include the sensitive data itself. In some embodiments, a DLP rule may include one or more entries in a database or list. For example, each row of customer data in a customer data list may comprise a DLP rule. As another example, each product-pricing entry in a product database may comprise a DLP rule. Alternatively, a single DLP rule may include a set of database entries or other data entries.

In addition to identifying content of a data object, a DLP rule may also identify other attributes of the data object. For example, a DLP rule may identify a data object name, a data object creation date, a data object modification date, a location where the data object is stored, a size of the data object, and/or any other attribute of the data object. A DLP rule may additionally or alternatively identify other contextual information associated with a data object. For example, a DLP rule may identify to whom a data object is being sent, from whom a data object is being sent, a destination location of a data object, and/or any other contextual information associated with a data object.

A set of DLP rules may include any group of one or more DLP rules. A set of DLP rules may include a list of data entries where each entry is a DLP rule, a database where each database entry is a DLP rule, a table where each column or row is a DLP rule, a set of documents where each document is a DLP rule, any combination of the foregoing, and/or any other set of DLP rules.

Content-matching module 116 may apply the set of DLP rules to the data object by comparing data identified in the rules with data in the data object. For example, if the rules comprise a signature of sensitive information, content-matching module 116 may compare the signature with a signature generated for data in the data object to determine whether the data object includes the sensitive information. As another example, content-matching module 116 may apply a DLP rule by directly (i.e., without calculating signatures) comparing the DLP rule with data in the data object.

Content-matching module 116 may apply a DLP rule in the set of DLP rules to the data object by determining whether the data object has an attribute identified by the DLP rule. For example, if the DLP rule identifies a file name, context-matching module 116 may determine whether the data object has the same name. As another example, if the DLP rule identifies an email sender, content-matching module 116 may determine whether the data object is being sent in an email from the email sender.

If a DLP rule matches data in the data object, content-matching module 116 may create a categorization for the data object that indicates that the data object contains information identified by the rule. Similarly, if a DLP rule matches an attribute or other contextual information of a data object, content-matching module 116 may create a categorization that indicates that the data object comprises the attribute or context indicated by the rule. Thus, a categorization of a data object may indicate a fact about the data object. In other words, a categorization of a data object may indicate that the data object includes certain information or that the data object has a particular attribute or context.

A set of categorizations of a data object may include one or more categorizations of the data object. For example, the data object may be an email sent from Jon to Bob, who are employees of company A, and Bob may work for a customer service department of company A. The email may include an attachment with sensitive customer information. After the email is detected, content-matching module 116 may apply a DLP rule set to the email. The DLP rule set may include rules identifying sensitive customer information and rules identifying customer service department employees. In this example, content-matching module 116 may determine two categorizations for the email: 1) the email includes an attachment that contains sensitive information and 2) the email is being sent to a customer service department employee. Thus, the set of categorizations of the email may include these two categorizations.

After the set of categorizations of the data object are determined, at step 430 categorization-normalization module 118 may distinguish a set of content-based categorizations in the set of categorizations from a set of context-based categorizations in the set of categorization. As used herein, the phrase "content-based categorizations" may refer to any categorization of content of a data object. In other words, a content-based categorization may be any categorization arising from a rule identifying content included in and/or associated with a data object. In some examples, content may be associated with a data object when the content is referred to in the data object (e.g., a hyperlink to the content), when the data object includes authentication information that enables access to the content, and/or when the data object includes other information associated with the data object.

In some embodiments, content-based categorizations may refer to any categorization of a data object that an organization does not want or need to reevaluate every time a DLP policy is applied to the data object. An organization may not need to reevaluate categorizations of a data object every time the object is subject to a DLP policy if the categorizations are not likely to change from one context to another. Thus, content-based categorizations may include categorizations that may not typically change from one context to another.

As used herein, the phrase "context-based categorizations" may refer to any categorizations based on a context of the data object rather than the content of a data object. In other words, context-based categorizations may include any non-content-based categorization of a data object. For example, context-based categorizations may include categorizations related to attributes of a data object. Such attributes may include a date the object was created, a date the object was modified, an author of the object, a location where the object is stored, a location where the object is being moved, a sender address of a message that contains the object, a recipient address of a message that contains the object, a time of day the object is being sent, a medium to which the object is being stored, and/or any other contextual attribute of a data object. In some embodiments, context-based categorizations may generally refer to categorizations associated with how a data object is used or stored.

In certain embodiments, another distinction between content-based categorizations and context-based categorizations may be that computing content-based categorizations is more computationally expensive than computing context-based categorizations. Thus, in some situations, content-based categorizations may include relatively expense categorizations to compute (e.g., categorizations that an organization may not want to recalculate every time a data object is subjected to a DLP policy), and context-based categorizations may include relatively inexpensive categorizations to compute.

Categorization-normalization module 118 may implement any suitable heuristic or algorithm to distinguish the set of content-based categorizations in the set of categorizations from the set of context-based categorizations in the set of categorizations. For example, a categorization may be identified as content- or context-based categorization based on a classification of a rule used to create the categorization. In such embodiments, rules may be classified as content- or context-based rules. An administrator or other user may classify some rules as content-based and some rules as context-based. Thus, categorizations may differ from organization to organization. Additionally or alternatively, a rule may be automatically classified based on one or more properties of the rule.

In addition to or instead of classifying a categorization based on a rule used to create the categorization, categorization-normalization module 118 may classify a categorization based on a property of the categorization itself. For example, categorization-normalization module 118 may track how much a categorization changes from one context to another. Categorization-normalization module 118 may classify categorizations that remain relatively unchanged from one context to another as content-based categorizations while classifying more variant categorizations as context-based categorizations. Categorization-normalization module 118 may also use any other algorithm or heuristic for determining whether a categorization is a content-based categorization or a context-based categorization.

By distinguishing between content-based categorizations and context-based categorizations, categorization-normalization module 118 may be able to create a set of content-based categorizations (i.e., a set of normalized categorizations). In some embodiments, categorization-normalization module 118 may distinguish between content-based categorizations and context-based categorizations by identifying only content-based categorizations in the set of categorizations. Additionally or alternatively, categorization-normalization module 118 may distinguish between content-based categorizations and context-based categorizations by identifying context-based categorizations. The set of content-based categorizations referred to in step 430 may include one or more content-based categorizations. The set of context-based categorizations referred to in step 430 may be an empty set or may include one or more context-based categorizations. In some embodiments, categorization-normalization module 118 may discard the context-based categorizations after they are used a first time.

At step 440, an enforcement module, such as enforcement module 122, may apply, based on the set of categorizations, a first DLP policy to the data object. Enforcement module 122 may apply the first DLP policy to the data object based on context- and/or content-based categorizations. For example, referring back to the example of company A, Jon attempted to send an email to Bob, and content-matching module 116 determined that 1) the email includes an attachment with sensitive customer information and 2) the email is being sent to a customer service department employee. The first DLP policy may indicate that emails with sensitive customer information may only be sent to customer service department employees. Thus, Jon's emails may be permitted under the first DLP policy and enforcement module 122 may allow the email to be transmitted to Bob.

As used herein, the phrase "DLP policy" may refer to any policy that defines how a data object with a particular categorization should be handled. For example, a DLP policy may define when to block communications, allow communications, create security alerts, use automated sender and on-screen notifications to educate employees on data security policies, protect sensitive data from being stored in unauthorized places, prevent information from being posted on web sites, prevent sensitive data from being copied to a removable storage device, prevent employees from burning sensitive data to an optical disc, and/or perform any other data security function.

At step 450, identification module 112 may identify the data object at a second time. The data object may be identified in any of the ways discussed in step 410. For example, referring back to the example of company A, Jon may attempt to send another email with the attachment containing the sensitive customer information to a third employee, Kim, who works for a research and development department of company A. Identification module 112 may identify the email sent to Kim.

At step 460, enforcement module 122 may apply, based on the set of content-based categorizations, a second DLP policy to the data object. For example, enforcement module 122 may apply, based on the previously determined set of content-based categorizations, a second DLP policy to the attachment in the email sent to Kim. In other words, one or more of the previously calculated content-based categorizations may be used at the second point in time. In the company A example, for the email to Kim, rather than recalculating the content-based categorization for the attachment, subsystem 330 may reuse the previously calculated content-based categorization (i.e., the categorization indicating that the attachment includes sensitive customer information). In contrast, the previously computed context-based categorization (i.e., the email is being sent to a customer service department employee) is not reused. Indeed, the context is different in the new situation because the email is being sent to a research and development department employee.

In this example, the second DLP policy may be the same as the first DLP policy (i.e., emails with sensitive customer information may only be sent to customer service department employees), though in other embodiments the first and second DLP policies may be different. Based on the new context of the email to Kim, enforcement module 122 may block the email to Kim, remove the attachment before sending the email to Kim, and/or perform any other designated security function.

In some embodiments, an applicability module may determine whether to reuse a previously calculated set of content-based categorizations. FIG. 5 illustrates a process similar to FIG. 4 in which an applicability module determines whether content-based categorizations are still applicable to a set of categorizations. At step 510, identification module 112 may identify a data object at a first time. The first time may refer to a first point in time and/or a first window of time. At step 520, content-matching module 116 may apply a first version of a set of DLP rules to the data object to determine a set of categorizations of the data object.

At step 530, categorization-normalization module 118 may distinguish a set of content-based categorizations in the set of categorization from a set of context-based categorizations in the set of categorizations. At step 540, enforcement module 122 may apply, based on the set of categorization, a first DLP policy to the data object. At step 550, identification module 112 may identify the data object at a second time. The second time may include a second point in time and/or a second window of time. Steps 510, 520, 530, 540, and 550 correspond to steps 410, 420, 430, 440, and 450. Therefore, the discussion of steps 410-450 applies to steps 510-550.

At step 560, applicability module 120 may determine a difference between a first state of the set of DLP rules at the first time and a second state of the set of DLP rules at the second time. Applicability module 120 may determine the difference between the first and second states of the set of DLP rules by applying any algorithm or heuristic to the first or second sets of DLP rules.

At decision point 570, applicability module 120 may determine whether the difference is below a predetermined threshold. For example, the difference may include a difference between the first and the second times, and the predetermined threshold may be a predetermined period of time (e.g., minutes, hours, days, weeks, etc.). In other embodiments, applicability module 120 may use a distance heuristic for determining whether to use or reuse the content-based categorizations. The distance between the two states of the set of DLP rules may indicate how many of the DLP rules from the first state do not match DLP rules from the second state. For example, the set of DLP rules may include 100 rows of customer data, with each row of customer data comprising a DLP rule. Between the first and second times, 5 rows of customer data may be added to the set of DLP rules. Thus, the difference between the states may be 5.

In some embodiments, applicability module 120 may determine whether the difference is below a predetermined threshold by determining whether the absolute distances is below a predetermined threshold. In the previous example with a distance of 5, if the predetermined threshold is 10, applicability module 120 may determine that the distance is below the predetermined threshold. In other embodiments, applicability module 120 may determine whether the difference is below a predetermined threshold by determining whether the set of DLP rules has changes less than a predetermined percentage. For example, if the set of DLP rules has changed less than 5 percent (or any other predetermined percentage) and the predetermined threshold is 3 percent, applicability module 120 may determine that the distance is not below the predetermined threshold.

If applicability module 120 determines that the difference is below a predetermine threshold, at step 580 applicability module 120 may indicate that the set of content-based categorizations may be used to apply the second DLP policy to the data object. If applicability module 120 determines that the difference is above the predetermined threshold, applicability module 120 may indicate that the content-based set of categorizations needs to be updated. In some embodiments, content-matching module 116 may update all of the content-based categorizations in the set of categorizations. In other embodiments, content-matching module 116 may only update a subset of the content-based categorizations (e.g., the categorizations that have changed).

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, applying, distinguishing, determining, caching, including, parsing, extracting, comparing, calculating, associating, discarding, storing, using, and updating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory ("RAM"), read only memory ("ROM"), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output ("I/O")

controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, applying, distinguishing, determining, caching, including, parsing, extracting, comparing, calculating, associating, discarding, storing, using, and updating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, applying, distinguishing, determining, caching, including, parsing, extracting, comparing, calculating, associating, discarding, storing, using, and updating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, applying, distinguishing, determining, caching, including, parsing, extracting, comparing, calculating, associating, discarding, storing, using, and updating steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, applying, distinguishing, determining, caching, including, parsing, extracting, comparing, calculating, associating, discarding, storing, using, and updating steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, applying, distinguishing, determining, caching, including, parsing, extracting, comparing, calculating, associating, discarding, storing, using, and updating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit ("ASIC") adapted to implement one or more of the exemplary embodiments disclosed herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network ("WAN"), a local area network ("LAN"), a personal area network ("PAN"), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage ("NAS") devices configured to communicate with servers 740 and 745 using various protocols, such as NFS, SMB, or CIFS.

Servers 740 and 745 may also be connected to a storage area network ("SAN") fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, applying, distinguishing, determining, caching, including, parsing, extracting, comparing, calculating, associating, discarding, storing, using, and updating steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for normalizing DLP-categorization information. For example, a computing system may identify a data object at a first time. The computing system may apply a first version of a set of data-loss-prevention rules to the data object to determine a set of categorizations of the data object. The computing system may distinguish a set of content-based categorizations in the set of categorizations from a set of context-based categorizations in the set of categorizations. The computing system may apply, based on the set of categorizations, a first data-loss-prevention policy to the data object.

The computing system may identify the data object at a second time, and apply, based on the set of content-based categorizations, a second data-loss-prevention policy to the data object.

In various embodiments, the computing system may, before applying the second data-loss-prevention policy to the data object, determine that the first version of the set of data-loss-prevention rules, as it existed at the first time, is applicable to the data object. In certain embodiments, the computing system may determine a difference between a first state of the set of data-loss-prevention rules at the first time and a second state of the set of data-loss-prevention rules at the second time. The computing system may determine that the first version of the set of data-loss-prevention rules is applicable to the data object by determining that the difference is below a predefined threshold.

In some embodiments, the difference may comprise a difference between the first time and the second time. In other embodiments, the difference between the first and second states of the set of data-loss-prevention rules may comprise a distance between the first and second states of the set of data-loss-prevention rules. In at least one embodiment, the computing system may cache the set of content-based categorizations. In certain embodiments, the computing system may include the set of content-based categorizations with the data object as metadata of the data object.

In various embodiments, the computing system may apply the first version of the set of data-loss-prevention rules to the data object by parsing a protocol of the data object, then by extracting, based on the protocol, content of the data object, and finally by comparing the content of the data object to the first version of the set of data-loss-prevention rules. In some embodiments, the computing system may calculate a signature for content of the data object, and associate the signature with one or more rules from the first version of the set of data-loss-prevention rules.

In certain embodiments, the computing system may discard the set of context-based categorizations, and store the set of content-based categorizations for later use. In some embodiments, the first data-loss-prevention policy may comprise the second data-loss-prevention policy.

In at least one embodiment, the computing system may identify a data object at a first time. The computing system may apply a first version of a set of data-loss-prevention rules to the data object to determine a set of categorizations of the data object. The computing system may distinguish a set of content-based categorizations in the set of categorizations from a set of context-based categorizations in the set of categorizations, and apply, based on the set of categorizations, a first data-loss-prevention policy to the data object. The computing system may also identify the data object at a second time. The computing system may determine a difference between a first state of the set of data-loss-prevention rules at the first time and a second state of the set of data-loss-prevention rules at the second time, and determine, based on the difference, whether to use the set of content-based categorizations to apply a second data-loss-prevention policy to the data object.

In some embodiments, the computing system may, if the difference is below a predetermined threshold, use the set of content-based categorizations to apply the second data-loss-prevention policy to the data object. The computing system may, if the difference is above the predetermined threshold, update the set of categorizations. In other embodiments, the computing system may cache the set of content-based categorizations, and include the set of content-based categorizations with the data object as metadata of the data object. In certain embodiments, the difference may include a difference between the first time and the second time, and/or a distance between the first and second states of the set of data-loss-prevention rules.

In various embodiments, the computing system may include at least one processor. The computing system may also include an identification module that may identify a data object at a first time and a second time. The computing system may also include a content-extraction module that may extract content from the data object. The computing system may include a content-matching module that may apply a first version of a set of data-loss-prevention rules to the data object to determine a set of categorizations of the data object. The computing system may also include a categorization-normalization module that may distinguish a set of content-based categorizations in the set of categorizations from a set of context-based categorizations in the set of categorizations. The computing system may also include an enforcement module that may apply, based on the set of categorizations, a first data-loss-prevention policy to the data object. The computing system may further include an applicability module. The applicability module may determine a difference between a first state of the set of data-loss-prevention rules at the first time and a second state of the set of data-loss-prevention rules at the second time, and determine, based on the difference, whether to use the set of content-based categorizations to apply a second data-loss-prevention policy to the data object.

In certain embodiments, the applicability module may, if the difference is below a predetermined threshold, use the set of content-based categorizations to apply the second data-loss-prevention policy to the data object. The applicability module may, if the difference is above the predetermined threshold, update the set of categorizations. In some embodiments, the categorization-normalization module may cache the set of content-based categorizations, and include the set of content-based categorizations with the data object as metadata of the data object.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed. One or more of the steps disclosed herein may transform data and/or a configuration of a storage device by modifying data on the storage device. In some embodiments, one or more steps of the instant disclosure may transform a set of categorizations by normalizing the set of categorizations.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for normalizing data-loss-prevention categorization information, at least a portion of the method being performed by a computing system comprising at least one processor, the method comprising:
    identifying a data object at a first time;
    applying a set of data-loss-prevention rules to the data object to determine a set of categorizations of the data object;
    distinguishing a set of content-based categorizations in the set of categorizations from a set of context-based categorizations in the set of categorizations;
    storing the set of content-based categorizations;
    applying, based on the set of categorizations, a first data-loss-prevention policy to the data object;
    identifying the data object at a second time;
    reusing the set of content-based categorizations to apply a second data-loss-prevention policy to the data object, wherein reusing the set of content-based categorizations to apply the second data-loss-prevention policy to the data object comprises:
    determining a new set of context-based categorizations of the data object at the second time;
    forming a new set of categorizations based on the new set of context-based categorizations and the set of content-based categorizations; and
    applying, based on the new set of categorizations, the second data-loss-prevention policy to the data object.

2. The computer-implemented method of claim 1, further comprising: before applying the second data-loss-prevention policy to the data object, determining that the set of data-loss-prevention rules, as it existed at the first time, is applicable to the data object.

3. The computer-implemented method of claim 2, further comprising: determining a difference between a first state of the set of data-loss-prevention rules at the first time and a second state of the set of data-loss-prevention rules at the second time, wherein determining that the first version of the set of data-loss-prevention rules is applicable to the data object comprises determining that the difference is below a predefined threshold.

4. The computer-implemented method of claim 3, wherein: the difference comprises a difference between the first time and the second time.

5. The computer-implemented method of claim 3, wherein: the difference between the first and second states of the set of data-loss-prevention rules comprises a distance between the first and second states of the set of data-loss-prevention rules.

6. The computer-implemented method of claim 1, further comprising: including the set of content-based categorizations with the data object as metadata of the data object.

7. The computer-implemented method of claim 1, wherein applying the first version of the set of data-loss-prevention rules to the data object comprises:
    parsing a protocol of the data object;
    extracting, based on the protocol, content of the data object;
    comparing the content of the data object to the set of data-loss-prevention rules.

8. The computer-implemented method of claim 1, further comprising: calculating a signature for content of the data object; associating the signature with one or more rules from the set of data-loss-prevention rules.

9. The computer-implemented method of claim 1, further comprising: discarding the set of context-based categorizations; storing the set of content-based categorizations for later use.

10. The computer-implemented method of claim 1, wherein the first data-loss-prevention policy comprises the second data-loss-prevention policy.

11. The computer-implemented method of claim 1, tangibly embodied as computer-readable instructions on at least one non-transitory computer-readable-storage medium.

12. A computer-implemented method for normalizing data-loss-prevention categorization information, at least a portion of the method being performed by a computing system comprising at least one processor, the method comprising:
    identifying a data object at a first time;
    applying a first version of a set of data-loss-prevention rules to the data object to determine a set of categorizations of the data object;
    distinguishing a set of content-based categorizations in the set of categorizations from a set of context-based categorizations in the set of categorizations;
    applying, based on the set of categorizations, a first data-loss-prevention policy to the data object; identifying the data object at a second time;
    determining a difference between a first state of the set of data-loss-prevention rules at the first time and a second state of the set of data-loss-prevention rules at the second time;
    determining, based on the difference, whether to use the set of content-based categorizations to apply a second data-loss-prevention policy to the data object;
    reusing the set of content-based categorizations to apply the second data-loss-prevention policy to the data object, wherein reusing the set of content-based categorizations to apply the second data-loss-prevention policy to the data object comprises:
    determining a new set of context-based categorizations of the data object at the second time;
    forming a new set of categorizations based on the new set of context-based categorizations and the set of content-based categorizations; and
    applying, based on the new set of categorizations, the second data-loss-prevention policy to the data object.

13. The computer-implemented method of claim 12, further comprising: if the difference is below a predetermined threshold, using the set of content-based categorizations to apply the second data-loss-prevention policy to the data object; if the difference is above the predetermined threshold, updating the set of categorizations.

14. The computer-implemented method of claim 12, further comprising at least one of: caching the set of content-based categorizations; including the set of content-based categorizations with the data object as metadata of the data object.

15. The computer-implemented method of claim 12, wherein the difference comprises at least one of: a difference between the first time and the second time; a distance between the first and second states of the set of data-loss-prevention rules.

16. The computer-implemented method of claim 12, tangibly embodied as computer-readable instructions on at least one non-transitory computer-readable-storage medium.

17. A system for normalizing data-loss-prevention categorization information, the system comprising:
- at least one processor;
- an identification module programmed to cause the at least one processor to identify a data object at a first time and a second time;
- a content-extraction module programmed to cause the at least one processor to extract content from the data object;
- a content-matching module programmed to cause the at least one processor to apply a first version of a set of data-loss-prevention rules to the data object to determine a set of categorizations of the data object;
- a categorization-normalization module programmed to cause the at least one processor to distinguish a set of content-based categorizations in the set of categorizations from a set of context-based categorizations in the set of categorizations;
- an enforcement module programmed to cause the at least one processor to apply, based on the set of categorizations, a first data-loss-prevention policy to the data object;
- an applicability module programmed to:
  - determine a difference between a first state of the set of data-loss-prevention rules at the first time and a second state of the set of data-loss-prevention rules at the second time;
  - determine, based on the difference, whether to use the set of content-based categorizations to apply a second data-loss-prevention policy to the data object;
- wherein the enforcement module is programmed to:
  - reuse the set of content-based categorizations to apply the second data-loss-prevention policy to the data object, wherein the enforcement module is programmed to reuse the set of content-based categorizations to apply the second data-loss-prevention policy to the data object by:
    - determining a new set of context-based categorizations of the data object at the second time;
    - forming a new set of categorizations based on the new set of context-based categorizations and the set of content-based categorizations; and
    - applying, based on the new set of categorizations, the second data-loss-prevention policy to the data object.

18. The system of claim 17, wherein the applicability module is programmed to cause the at least one processor to perform at least one of: if the difference is below a predetermined threshold, using the set of content-based categorizations to apply the second data-loss-prevention policy to the data object; if the difference is above the predetermined threshold, updating the set of categorizations.

19. The system of claim 17, wherein the categorization-normalization module is programmed to cause the at least one processor to perform at least one of: caching the set of content-based categorizations; including the set of content-based categorizations with the data object as metadata of the data object.

* * * * *